United States Patent
Ronkainen (10) Patent No.: US 9,965,158 B2
(45) Date of Patent: May 8, 2018

(54) TOUCH SCREEN HOVER INPUT HANDLING

(75) Inventor: Sami Pekka Ronkainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 799 days.

(21) Appl. No.: 14/385,157

(22) PCT Filed: Mar. 14, 2012

(86) PCT No.: PCT/EP2012/054483
§ 371 (c)(1),
(2), (4) Date: Sep. 14, 2014

(87) PCT Pub. No.: WO2013/135286
PCT Pub. Date: Sep. 19, 2013

(65) Prior Publication Data
US 2015/0052481 A1    Feb. 19, 2015

(51) Int. Cl.
| | | |
|---|---|---|
| G06F 3/0481 | (2013.01) | |
| G06F 3/0484 | (2013.01) | |
| G06F 3/041 | (2006.01) | |
| G06F 3/0488 | (2013.01) | |
| G06F 3/0482 | (2013.01) | |

(52) U.S. Cl.
CPC ........ G06F 3/04845 (2013.01); G06F 3/0412 (2013.01); G06F 3/0416 (2013.01); G06F 3/0482 (2013.01); G06F 3/04817 (2013.01); G06F 3/04842 (2013.01); G06F 3/04883 (2013.01); G06F 3/04886 (2013.01);
(Continued)

(58) Field of Classification Search
CPC .. G06F 3/04845; G06F 3/0416; G06F 3/0482; G06F 3/04817; G06F 3/0412; G06F 3/04886; G06F 2203/04805

USPC .......................................................... 715/773
See application file for complete search history.

(56) References Cited

U.S. PATENT DOCUMENTS

2004/0204128 A1\* 10/2004 Zakharia ............. G06F 3/04812
455/566
2009/0251422 A1  10/2009 Wu et al.
(Continued)

FOREIGN PATENT DOCUMENTS

| CN | 101430632 A | 5/2009 |
| GB | 2462171 A | 2/2010 |

OTHER PUBLICATIONS

International Search Report and Written Opinion received in Patent Cooperation Treaty Application No. PCT/EP2012/054483, dated Dec. 3, 2012, 9 pages.
(Continued)

*Primary Examiner* — Phuong H Nguyen
(74) *Attorney, Agent, or Firm* — Banner & Witcoff, Ltd.

(57) ABSTRACT

Apparatus has at least one processor and at least one memory having computer-readable code stored thereon. When executed, the code controls the at least one processor: to cause display of a list or array of objects on a touch screen; to respond to detecting a users digit at a location hovering over but not touching the touch screen by causing display of a first object at a location corresponding to the location of the digit to be changed from an original size to an enlarged size while causing display of other objects to remain substantially or exactly at their original size; and while the first object is displayed at the large size, to respond to detecting a trigger by increasing the size of a target area in which response is made to a touch input by selecting the first object.

18 Claims, 8 Drawing Sheets

(52) U.S. Cl.
CPC .............. *G06F 2203/04101* (2013.01); *G06F 2203/04108* (2013.01); *G06F 2203/04805* (2013.01)

(56) References Cited

U.S. PATENT DOCUMENTS

| | | | | |
|---|---|---|---|---|
| 2009/0262087 A1* | 10/2009 | Kim | .................. | G06F 3/0488 345/173 |
| 2009/0309851 A1 | 12/2009 | Bernstein | | |
| 2010/0090964 A1* | 4/2010 | Soo | .................. | G06F 3/0416 345/173 |
| 2011/0018811 A1* | 1/2011 | Miernik | ................ | G06F 3/0416 345/173 |

OTHER PUBLICATIONS

Mar. 8, 2016 (EP) EP Office Action—App 12709316.9.
Oct. 8, 2016 (CN) Chinese Office Action—App 201280073119.0.
Jun. 21, 2017 (CN) Chinese Office Action—App 201280073119.0.

\* cited by examiner

TOUCH SCREEN HOVER INPUT HANDLING

RELATED APPLICATION

This application was originally filed as Patent Cooperation Treaty Application No. PCT/EP2012/054483 filed Mar. 14, 2012.

FIELD OF THE INVENTION

This invention relates to handling inputs on touch screens with hover detection.

BACKGROUND TO THE INVENTION

It is common for devices such as mobile telephones, smartphones and tablet computers to provide a touch-sensitive display, or touch screen, through which a user can interact with software executed on a processor of the device. Touch screens are increasingly commonly being applied to laptop and desktop computers.

A new generation of touch screens is able to detect hover inputs as well as touch inputs, and detect the location of the hover inputs in the plane of the touch screen (the x,y location). Hover inputs are inputs where a user's digit is located near to the touch screen but is not touching the screen. These touch screens provide new opportunities for user interface design, better designs allowing users better to control their device to perform the actions and tasks that the user requires to be performed.

SUMMARY OF THE INVENTION

A first aspect of the invention provides a method comprising:
  causing display of a list or array of objects on a touch screen;
  in response to detecting a user's digit at a location hovering over but not touching the touch screen, causing display of a first object at a location corresponding to the location of the digit to be changed from an original size to an enlarged size whilst causing display of other objects to remain substantially or exactly at their original size; and
  whilst the first object is displayed at the large size, responding to detecting a trigger by increasing the size of a target area in which response is made to a touch input by selecting the first object.

The method may comprise responding to a touch input in the target area by selecting the first object.

The target area after the trigger is detected may substantially coincide with the enlarged size of the first object.

The method may comprise, whilst the first object is displayed at the enlarged size, responding to detecting the digit no longer hovering over the touch screen by causing display of the first object to be decreased from the enlarged size.

The method may comprise subsequent to detecting the trigger and increasing the size of the target area, responding to detecting movement of the digit away from the touch screen without the touch screen having been touched by decreasing the size of the target area.

The method may comprise subsequent to detecting the trigger and increasing the size of the target area, responding to detecting the digit hovering over but not touching the touch screen at a location outside the area of the object at the large size by:
  causing display of a second object at a location corresponding to the location of the digit to be increased from an original size to an enlarged size; and
  causing display of the first object to be decreased from the enlarged size whilst causing display of other objects to remain substantially or exactly at their original size.

The method may comprise, whilst the second object is displayed at the large size, responding to detecting the digit no longer hovering over the touch screen by causing display of the second object to be decreased from the enlarged size to the original size.

Detecting the trigger may comprise detecting movement of the digit towards the touch screen Detecting movement of the digit towards the touch screen may comprise determining that the user's digit has moved towards the touchscreen by an amount exceeding a selection threshold. The method may comprise responding to detecting that the user's digit has been hovering substantially at the same location over an object for a threshold period of time by reducing the selection threshold.

Alternatively, detecting the trigger may comprise detecting that the user's digit has been hovering substantially at the same location over an object for a threshold period of time.

The array of objects may be a two-dimensional array.

The objects may be icons. The objects may alternatively be keys of a virtual keyboard.

Another aspect provides a computer program comprising instructions that when executed by a computer apparatus control it to perform the method above.

A second aspect of the invention provides apparatus comprising:
  means for causing display of a list or array of objects on a touch screen;
  means for, in response to detecting a user's digit at a location hovering over but not touching the touch screen, causing display of a first object at a location corresponding to the location of the digit to be changed from an original size to an enlarged size whilst causing display of other objects to remain substantially or exactly at their original size; and
  means for, whilst the first object is displayed at the large size, responding to detecting a trigger by increasing the size of a target area in which response is made to a touch input by selecting the first object.

The apparatus may comprise means for responding to a touch input in the target area by selecting the first object.

The target area after the trigger is detected may substantially coincide with the enlarged size of the first object.

The apparatus may comprise means for, whilst the first object is displayed at the enlarged size, responding to detecting the digit no longer hovering over the touch screen by causing display of the first object to be decreased from the enlarged size.

The apparatus may comprise means for, subsequent to detecting the trigger and increasing the size of the target area, responding to detecting movement of the digit away from the touch screen without the touch screen having been touched by decreasing the size of the target area.

The apparatus may comprise means for, subsequent to detecting the trigger and increasing the size of the target area, responding to detecting the digit hovering over but not touching the touch screen at a location outside the area of the object at the large size by:
  causing display of a second object at a location corresponding to the location of the digit to be increased from an original size to an enlarged size; and causing display of the first object to be decreased from the enlarged size whilst causing display of other objects to remain substantially or exactly at their original size.

The apparatus may comprise means for, whilst the second object is displayed at the large size, responding to detecting the digit no longer hovering over the touch screen by causing display of the second object to be decreased from the enlarged size to the original size.

The means for detecting the trigger may comprise means for detecting movement of the digit towards the touch screen The means for detecting movement of the digit towards the touch screen may comprise means for determining that the user's digit has moved towards the touchscreen by an amount exceeding a selection threshold.

The apparatus may comprise means for responding to detecting that the user's digit has been hovering substantially at the same location over an object for a threshold period of time by reducing the selection threshold.

The means for detecting the trigger may comprise means for detecting that the user's digit has been hovering substantially at the same location over an object for a threshold period of time.

The array of objects may be a two-dimensional array.

The objects may be icons. The objects may alternatively be keys of a virtual keyboard.

The apparatus may be a computing device, for instance a mobile phone, portable computer or non-portable computer.

A third aspect of the invention provides apparatus having at least one processor and at least one memory having computer-readable code stored thereon which when executed controls the at least one processor:

to cause display of a list or array of objects on a touch screen;

to respond to detecting a user's digit at a location hovering over but not touching the touch screen by causing display of a first object at a location corresponding to the location of the digit to be changed from an original size to an enlarged size whilst causing display of other objects to remain substantially or exactly at their original size; and whilst the first object is displayed at the large size, to respond to detecting a trigger by increasing the size of a target area in which response is made to a touch input by selecting the first object.

The code when executed may control the processor to respond to a touch input in the target area by selecting the first object.

The target area after the trigger is detected may substantially coincide with the enlarged size of the first object.

The code when executed may control the processor, whilst the first object is displayed at the enlarged size, to respond to detecting the digit no longer hovering over the touch screen by causing display of the first object to be decreased from the enlarged size.

The code when executed may control the processor, subsequent to detecting the trigger and increasing the size of the target area, to respond to detecting movement of the digit away from the touch screen without the touch screen having been touched by decreasing the size of the target area.

The code when executed may control the processor, subsequent to detecting the trigger and increasing the size of the target area, responding to detecting the digit hovering over but not touching the touch screen at a location outside the area of the object at the large size:

to cause display of a second object at a location corresponding to the location of the digit to be increased from an original size to an enlarged size; and to cause display of the first object to be decreased from the enlarged size whilst causing display of other objects to remain substantially or exactly at their original size.

The code when executed may control the processor, whilst the second object is displayed at the large size, to respond to detecting the digit no longer hovering over the touch screen by causing display of the second object to be decreased from the enlarged size to the original size.

The code when executed may control the processor to detect the trigger by detecting movement of the digit towards the touch screen. The code when executed may control to detect movement of the digit towards the touch screen by determining that the user's digit has moved towards the touchscreen by an amount exceeding a selection threshold. The code when executed may control the processor to respond to detecting that the user's digit has been hovering substantially at the same location over an object for a threshold period of time by reducing the selection threshold.

Alternatively, the code when executed may control the processor to detect the trigger comprises detecting that the user's digit has been hovering substantially at the same location over an object for a threshold period of time.

The array of objects may be a two-dimensional array.

The objects may be icons. Alternatively, the objects may be keys of a virtual keyboard.

A fourth aspect of the invention provides a non-transitory computer-readable storage medium having stored thereon computer-readable code, which, when executed by computing apparatus, causes the computing apparatus to perform a method comprising:

causing display of a list or array of objects on a touch screen;

in response to detecting a user's digit at a location hovering over but not touching the touch screen, causing display of a first object at a location corresponding to the location of the digit to be changed from an original size to an enlarged size whilst causing display of other objects to remain substantially or exactly at their original size; and whilst the first object is displayed at the large size, responding to detecting a trigger by increasing the size of a target area in which response is made to a touch input by selecting the first object.

BRIEF DESCRIPTION OF THE DRAWINGS

Embodiments of the invention will now be described, by way of example only, with reference to the accompanying drawings, in which.

DESCRIPTION OF EMBODIMENTS OF THE INVENTION

Embodiments described herein relate to an apparatus configured to cause increase the size of a target area in which response is made to a touch input by selecting an object when certain hover inputs are made such as to increase the possibility of a user selecting an object that they intend to select. Objects may for instance be icons, or they may be keys of a virtual keyboard. In some embodiments, a trigger to enlarging the target area is detecting a hover input held for a period of time. In some embodiments, a trigger to enlarging the target area is detecting a movement towards the touch screen. In some embodiments, a trigger to enlarging the target area is detecting a hover input held for a period of time followed by detecting a movement towards the touch screen.

Figure 1:
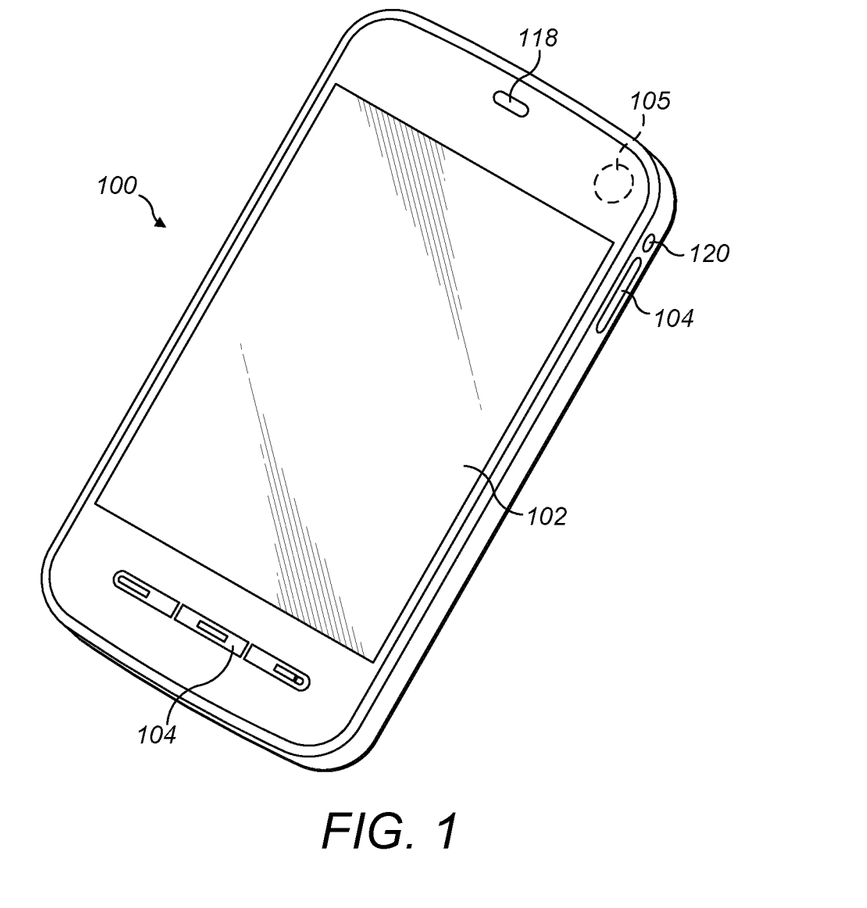
FIG. 1 is a perspective view of a mobile terminal embodying aspects of the invention.

Referring firstly to FIG. 1, a terminal 100 is shown. The exterior of the terminal 100 has a touch sensitive display or touch screen 102 with hover detection. The terminal 100 also has hardware keys 104. The terminal also has a speaker 118. The terminal 100 includes a headphone port 120. Other features are present but are omitted from this description for clarity and conciseness.

Figure 2:
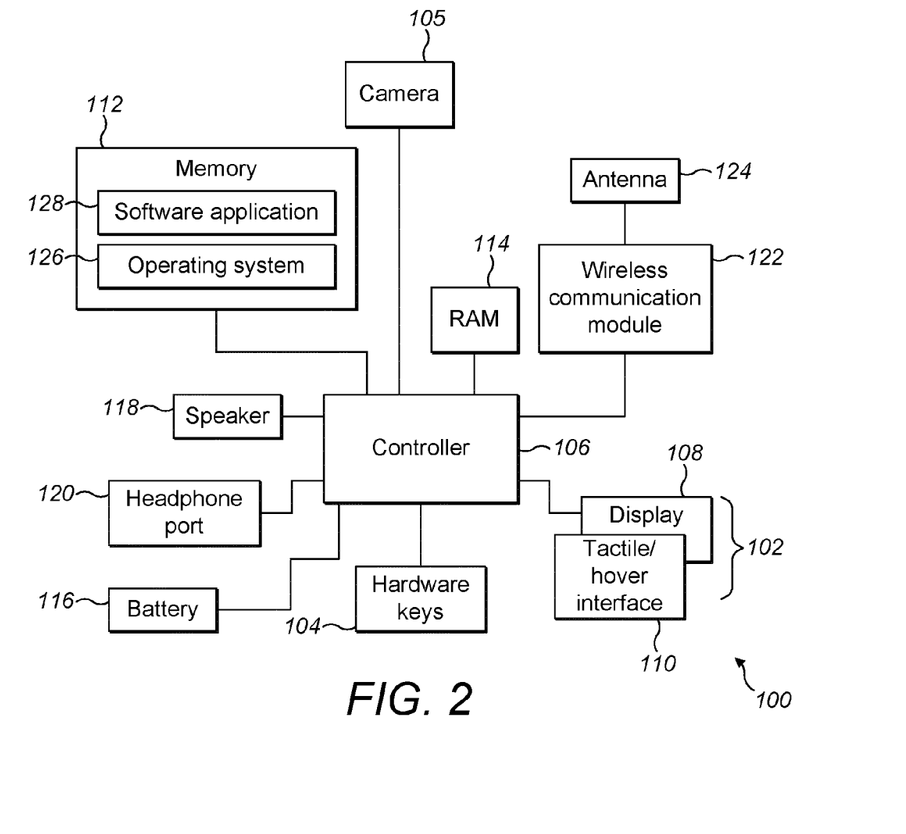
FIG. 2 is a schematic diagram illustrating components of the FIG. 1 mobile terminal and their interconnection.

FIG. 2 shows a schematic diagram of the components of terminal 100. The terminal 100 has a controller 106, a touch sensitive display 102 comprised of a display part 108 and a tactile/hover interface part no, the hardware keys 104, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may be a microcontroller, plural microcontrollers, a processor, or plural processors.

The terminal 100 may be a mobile telephone or smartphone, a personal digital assistant (PDA), a portable media player (PMP), a portable computer or any other device capable of running software applications. In some embodiments, the terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 is for displaying images and text to users of the terminal. The tactile/hover interface part no is for receiving touch and hover inputs from users.

The touch screen with hover detection 102 may take any suitable form. The tactile and hover detection aspects of the tactile/hover interface 110 in most instances utilise the same components, although they may alternatively be separate aspects using none or only some shared components. The outputs of the tactile/hover interface no may take any suitable form. They may take the form or x,y and z coordinates, where x and y are directions in the plane of the touch screen 102 and z is a direction perpendicular to the touch screen 102, so denoting hover distance. The z direction output of the tactile/hover interface no may alternatively denote a strength or size or other scalar parameter of an input. The outputs may also include a size or strength parameter relating to an x,y touch input. The tactile/hover interface 110 preferably is a multi-touch device, with the capability to provide x,y outputs for each of plural touch inputs.

As well as storing the operating system 126 and software applications 128, the memory 112 may also store multimedia files such as music and video files. A wide variety of software applications 128 may be installed on the terminal including web browsers, email applications, other messaging applications such as SMS, IM and MMS applications, social networking applications, radio and music players, games and utility applications. Some or all of the software applications stored on the terminal may provide audio outputs. The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software applications not stored on the terminal. These may be applications stored on a remote server device and may run partly or exclusively on the remote server device. These applications can be termed cloud-hosted applications. The terminal 100 may be in communication with the remote server device in order to utilise the software application stored there. This may include receiving audio outputs provided by the external software application.

In some embodiments, the hardware keys 104 are dedicated volume control keys or switches. The hardware keys may for example comprise two adjacent keys, a single rocker switch or a rotary dial. In some embodiments, the hardware keys 104 are located on the side of the terminal 100.

In the following, actions taken will be understood to be provided under control of or by the controller 106 on the basis of instructions included in software comprising one of the software applications 128 or the operating system 126, or a combination of the operating system 126 and one or more software applications 128.

Operation of the terminal 100 in a first group of embodiments will now be described with reference to the flow chart of FIG. 3.

The operation begins at step S1. At step S2, an array of icons is displayed at their original size. This is illustrated in FIG. 4. Here, the terminal is shown as providing a grid array of icons. The icons occupy most of the display area of the touch screen 102. The icons are arranged in a regular square grid pattern, although other array forms may alternatively be used. The icons here are square in shape, but they may take some other shape.

Between each icon and neighbouring icons is a small gap. A background image may be provided, the background image being visible in the gaps between the icons. The use of the background image and gaps between icons provides a more pleasing visual effect and improves readability for the user.

In FIG. 4, the icons can be said to be displayed at original size. In this example, all of the icons are of the same size, although alternatively some may be differently sized. An example icon size is 7 mm square. In this state, which may be termed original icon display state, the terminal 100 is responsive to a user input at a location corresponding to one of the icons to perform an action associated with selection of the icon. In the example of the icons being thumbnails of photographs, the action may be opening the corresponding photograph, that is displaying the photograph in a full size view. In the case of the icon being a bookmark, detecting a user input at the location of the icon may cause the terminal 100 to go to a web page that is linked to by the bookmark. Clearly, these are merely examples. In the example of the icons being thumbnails of videos, detecting a user input at the location of the icon may cause the terminal 100 to open the video on a media player application or commence playing the video. In the example of the icon being text or a graphic denoting an e-book or text document, detecting a user input at the location of the icon may cause the terminal 100 to open the e-book or text document. In the example of the icon being an application shortcut, detecting a user input at the location of the icon may cause the terminal 100 to open the application. In the example of the icon being a contact icon, detecting a user input at the location of the icon may cause the terminal 100 to open the corresponding contact in a contacts application or take a predefined action associated with that contact, for instance initiate a call to that contact or open a blank message addressed to that contact.

The areas of the display 102 in which the terminal 100 is responsive to a user input may be termed target areas. There may be one target area per icon, with an input in a target area resulting in selection of the corresponding icon. A target area may coincide with the icon completely, i.e. the target area may be the same size and shape as the icon and be located at the same location as the icon. In this case, the gaps between the icons do not form part of any target area. Here, detection of a user input at a location on the touch screen 102 that is within one of the gaps does not result in selection of any of the icons. Alternatively, the target areas may be slightly larger than the icons. In these embodiments, there may or may not be gaps between adjacent target areas.

A user input in a target area may take one of a number of suitable forms. For instance, a short duration input, termed a "press", is one form of input. Another form of input is a "long press", which is a touch input at a location for a time period exceeding a threshold. The threshold may for instance be between 0.5 and 1.5 seconds, typically around one second. The user input may be detected typically when the user's digit (typically a finger) is removed from the touch screen 102, i.e. at the time that the touch input ceases. If the location of the touch input moves between the starting and ending of the touch input, it is typically the location at the end of the touch input that is deemed to be the location of the input. Here, action is taken depending on the target area in which the user's digit was located at the time of removal of the user's digit from the touch screen 102.

Figure 3:
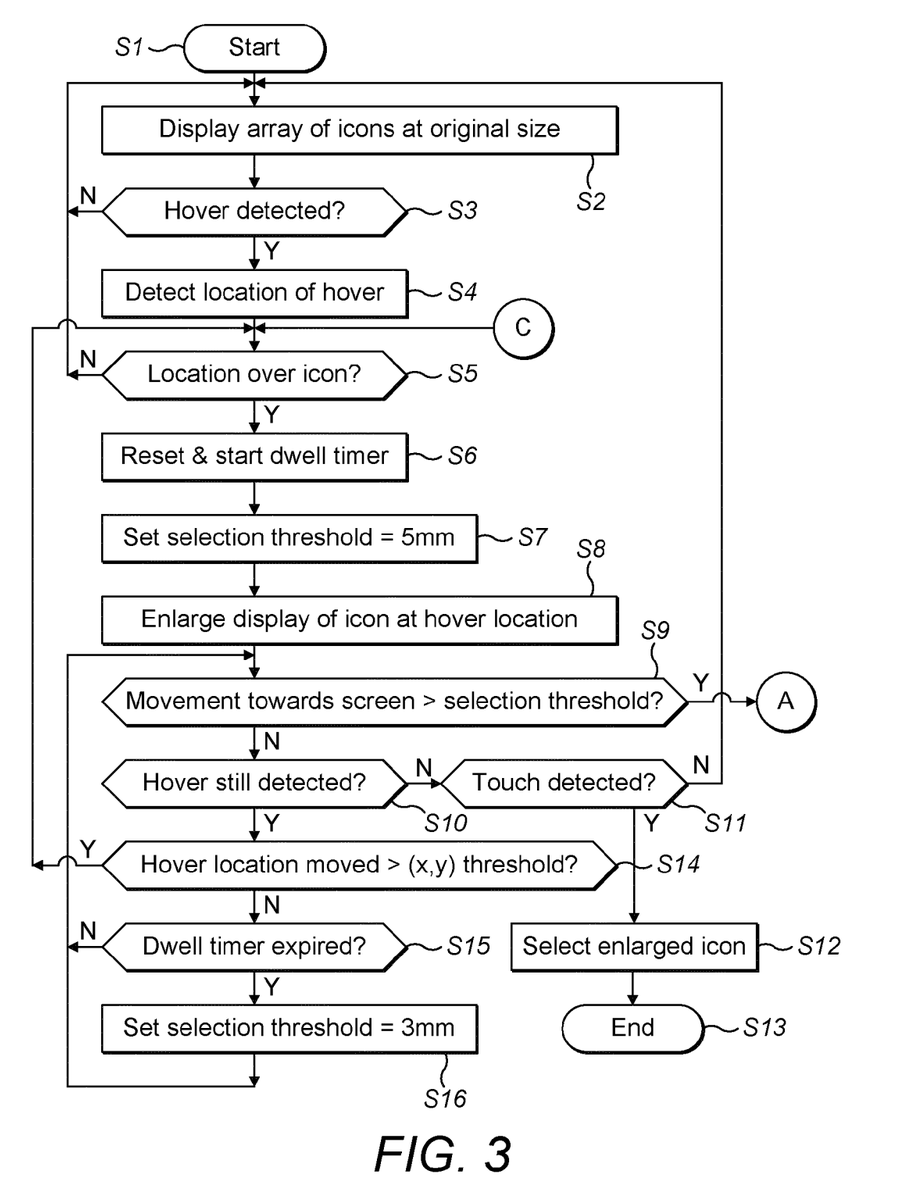
FIG. 3 is a flow chart illustrating operation of the FIGS. 1 and 2 mobile device in a first group of embodiments of the invention.
Figure 4:
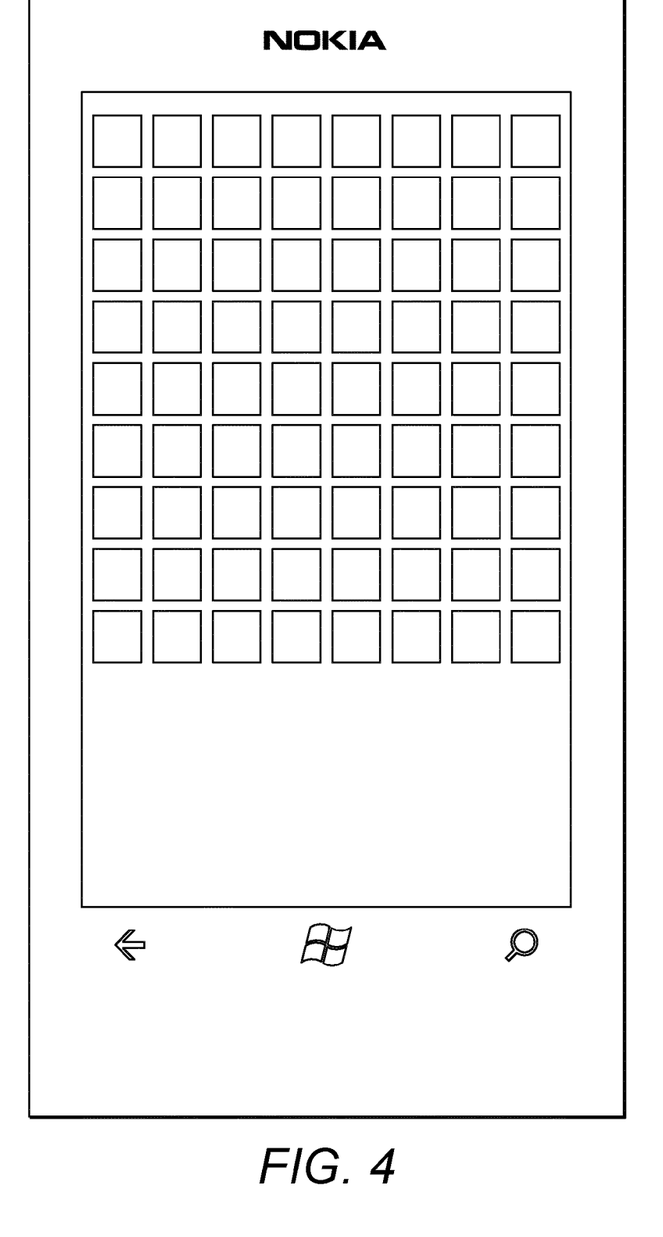
FIGS. 4 to 6 are screen shots illustrating displays of the FIG. 1 mobile device at different stages of operation in the first group of embodiments.

The response of the terminal 100 to a touch input without a hover being detected beforehand is outside the scope of this specification and is not shown in FIG. 3.

At step S3 of FIG. 3, it is determined whether a hover input is detected. A hover input, or just hover, may be detected in any suitable way. A hover may be detected in response to determining that a user's digit is within the sensitivity range of the tactile/hover interface 110. Alternatively, a hover may be detected in response to determining that a user's digit has been at a certain location within the zone of sensitivity of the tactile/hover interface 110 for greater than a predetermined period of time, which may be of the order of a few hundreds of milliseconds. Alternatively, a hover may be detected in response to determining that a user's digit is within a certain range, for instance 30 mm, of the touch screen 102.

If a hover is not detected at step S3, the operation returns to step S2. In this way, the array of icons are displayed at their original size until a hover input is detected at step S3 (or until a touch input is detected, although this is not shown in the Figure).

At step S4, the location of the hover is detected.

At step S5, it is determined whether the location of the hover is above an icon. In the event of a negative determination, the operation returns to step S2, where the icons in the array are displayed at their original size, as shown in FIG. 4. In this case, steps S3 and S4 are repeated until it is determined that the location of the hover is above an icon.

Following a positive determination at step S5, the terminal 100 enters an icon browse mode. Here, at step S6 a dwell timer is reset and started. Subsequently, at step S7 a selection threshold is set, in this example it is set at 5 mm. At step S8, the display of the icon at the hover location is enlarged. In this example, the size of the enlarged icon is 20 mm square.

Figure 5:
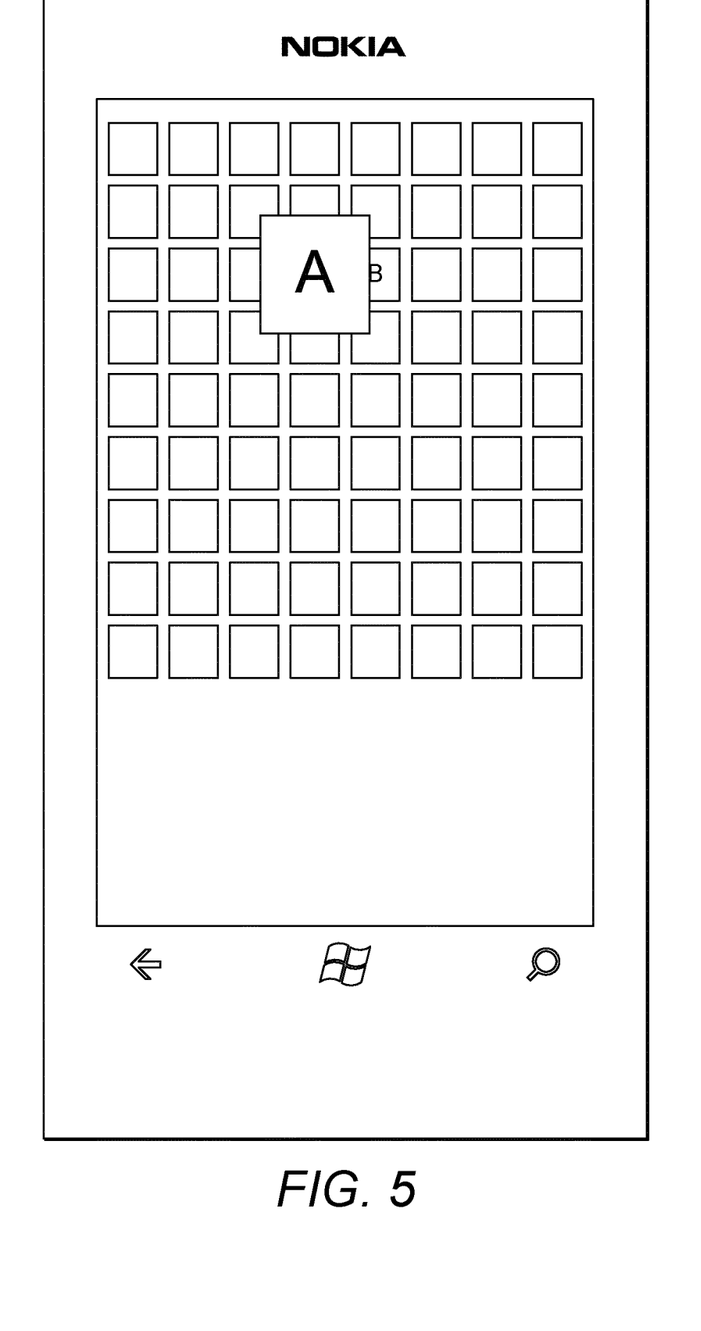

The display resulting at step S8 is shown in FIG. 5. Here it will be seen that most of the display is the same as that shown in FIG. 4. However, one of the icons, labelled A, is shown as enlarged compared to the other icons. The first icon A overlaps some of the other icons, because of its larger size. In this mode, the target area corresponding to the enlarged icon A is unchanged from the original target area size, shown in FIG. 4. As such, the target area corresponding to the first icon A is the same size as the icon prior to enlargement at step S8.

At step S9 it is determined whether there has been movement of the user's digit towards the touch screen 102 by an amount greater than a selection threshold. The first time that step S9 is performed, the selection threshold is 5 mm, as set in step S7. The determination of step S9 is performed by the terminal examining the lead output of the tactile/hover interface 110 and determining whether there has been a change in the output by an amount exceeding 5 mm.

It will be appreciated that this step is performed after a hover has been detected at step S3. Depending on how hover detection is performed at step S3, step S9 may not result in a positive determination if the user merely intends to make a touch input without first making a hover input. For instance, detecting a hover in step S3 only if it is determined that the user's digit has remained at substantially the same location for a time period greater than a threshold of, for example, a few hundred milliseconds ensures that a positive determination is provided by step S9 only if the user is moving their digit towards the touch screen 102 after an intentional hover input. Here, the hover distance, being the z distance of the hover input, is the reference against which movement of the user's digit towards the touch screen is measured and compared to the selection threshold. If the user moves their digit either towards or away from the touch screen and hovers there for a predetermined time (without moving by a threshold amount in the x,y plane), the new hover location is used to reset the hover location.

Furthermore, step S9 may require determining that the movement has exceeded the selection threshold only if the movement has been completed within a predetermined time period. For instance, step S9 may provide a positive determination only if it is determined that the user's digit has moved by an amount greater than the selection threshold within a period less than a few hundreds of milliseconds. If the movement towards the screen takes place over a period greater than the threshold, for instance a few hundred milliseconds, this may be inferred to be due to unintended wavering of the user's digit rather than an intentional movement towards the touch screen 102.

In the event of a negative determination at step S9, the operation proceeds to step Sm. Here it is determined whether a hover is still detected. This can be determined in any suitable way. For instance, a hover may be detected as being still in place if the location of the user's digit has not changed by a significant degree within a period of time, for instance a few hundred milliseconds.

If it is determined at step S10 that a hover is not still detected, at step S11 it is determined whether a touch input is detected. If a touch input is determined to have been detected at step S11, at step S12 the enlarged icon is selected. After selection of the enlarged icon at step S12, the operation ends at step S13. Here, the terminal 100 exits the icon browse mode.

If at step S11 it is determined that a touch input is not detected, the operation returns to step S2. Here, the terminal 100 exits the icon browse mode.

It will be appreciated that steps S10 to S13 are performed whilst the terminal 100 is in the icon browse mode. As such, step S11 requires the touch to be detected in the target area that has the same size and form as the target area present when the icons were displayed at their original size in step S2. If the touch input is determined to have occurred outside of the target area, then the corresponding icon is not selected at step S12. Although not shown in FIG. 3, if the touch input is detected at a position that does not correspond to any target area, then no action occurs, or alternatively an action other than selection of an icon occurs.

If step S10 shows that a hover is still detected, it is determined at step S14 whether the hover location has moved an amount greater than a threshold in the x,y plane. The x,y threshold may take any suitable value. For instance, the value may correspond to 2 mm or a few mm. In the icon browse mode, movement in the x,y plane of a hover input allows the user to enlarge different ones of the icons without selecting any icon.

Figure 6:
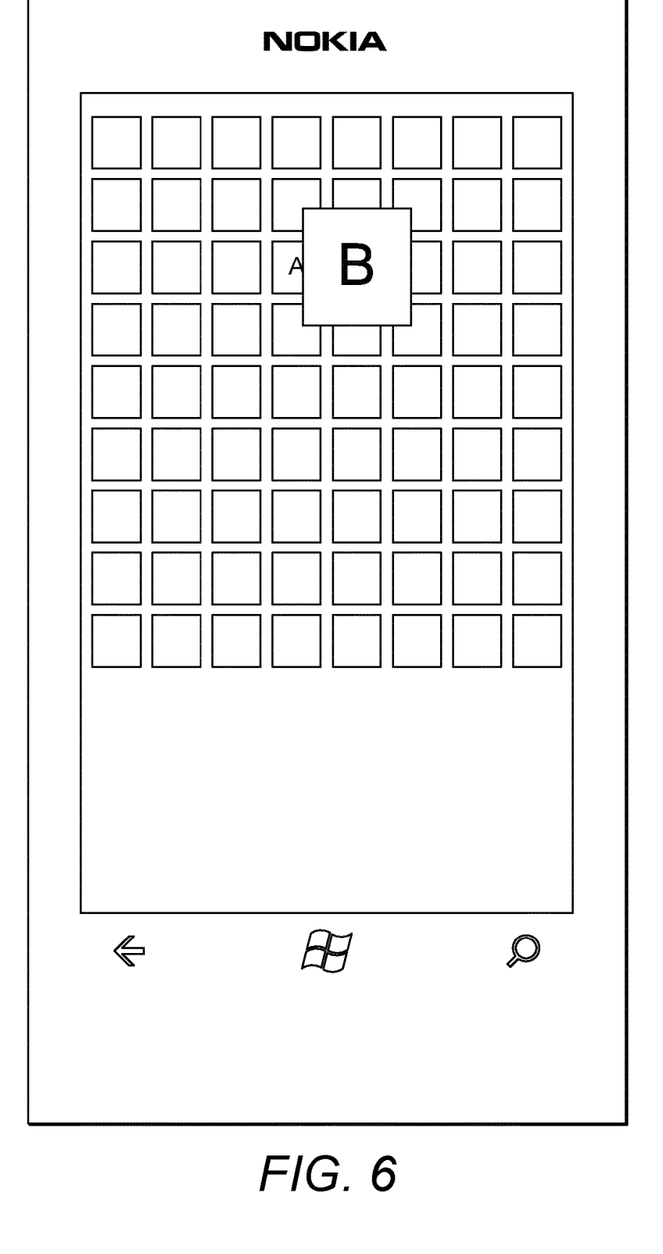

If at step S14 it is determined that the location has moved by an amount greater than the threshold in the x,y plane, the operation returns to step S5. If at step S5 it is determined that the location of the hover input is not over an icon, the operation proceeds to step S2, where the array of icons are displayed at their original size. Once it is determined at step S5 that the location of the hover input is above an icon, whether it is the same icon or a different icon, the dwell timer is reset and started at step S6 and the selection threshold is set at step S7. Additionally, the icon is displayed at the enlarged size at step S8. This is shown in FIG. 6. Here, an adjacent icon B is shown enlarged.

If it is determined at step S14 that hover location has not moved by an amount greater than the x,y threshold, at step S15 it is determined whether the dwell timer has expired. If it is determined that the dwell timer has not expired, the operation returns to step S9. If it is determined at step S15 that the dwell timer has expired, the selection threshold is set to second value, here 3 mm, at step S16. After step S16, the operation returns to step S9.

The effect of steps S15 and S16 is to change the selection threshold from 5 mm to 3 mm when it is determined that the hover input is at approximately the same location for a period of time greater than the dwell timer value. The dwell timer is reset if the location of the hover input moves by more than the x,y threshold, so the selection threshold is reduced only if it is determined that the hover input remains at substantially the same location.

The selection threshold set at step S7 may be termed the first selection threshold, and the selection threshold set at step S16 may be termed the second selection threshold. The second selection threshold is lower than the first selection threshold.

When the selection threshold is 3 mm instead of 5 mm, step S9 produces a positive determination in response to a detection of less movement of the user's digit towards the touch screen 102. As such, the terminal 100 is more sensitive to movement of the user's digit towards the screen after the user has provided a hover input at substantially the same location for a period of time equal to the value of the dwell timer. The dwell timer may take any suitable value, for instance a few hundred milliseconds. The dwell timer value may for instance be 500 milliseconds. Alternatively, it may take any value in the range of 300 milliseconds to 800 milliseconds, or more specifically in the range of 400 milliseconds to 600 milliseconds.

Operation of the terminal following detection at step S9 that the user's digit has moved towards the touch screen 102 by an amount greater than the selection threshold will now be described. On a positive determination, the terminal exits the icon browse mode and enters an icon lock mode.

In response to a positive determination at step S9, the operation proceeds to step S17. Here, the size of the target area of the enlarged icon is increased. In particular, the size of the target area is increased from its initial value, which is the same value as that found when the icons are displayed at their original size at step S2, to a value that is greater. The size of the target area after the increase may take any suitable form. In this example, the size of the target area is increased to have the same size as the enlarged icon as displayed following step S8. In this example, the enlarged target area is 20 mm square. Alternatively, the size of the target area may be increased to some other value.

Detection that the user's digit has moved towards the touch screen 102 by an amount greater than the selection threshold is a trigger to enlarging the target area associated with the icon.

At step S18, it is determined whether a touch input within the target area is detected. In response to determining at step S18 that a touch input within the target area has been detected, the enlarged icon is selected at step S19. Following step S19, the operation ends at step S20. Here, the terminal 100 exits the icon lock mode. Step S19 is the same as step S12, described above.

In response to a determination that a touch input within the target area has not been detected at step S18, the operation proceeds to step S21. Here, it is determined whether a hover input is still detected. Upon determining that a hover input is not still detected, the operation proceeds to return to step S2, where the array of icons is displayed at their original size. Here, the terminal 100 exits the icon lock mode.

Otherwise, it is determined at step S22 whether the location of the hover input has moved to a location outside of the target area. This target area is the enlarged size of target area, following step S17. If it is determined that the hover location has moved to a location outside of the enlarged target area, the operation returns to step S5, from where processing of the location of the hover input and the display of enlarged icons as appropriate is provided. Here, the terminal 100 exits the icon lock mode and enters the icon browse mode. If it is determined at step S22 that the hover location has not moved outside of the enlarged target area, the operation returns to step S18, where it is determined again whether a touch input within the target area has been detected. Steps S18, S21 and S22 are repeated until it is determined that a touch input within the target area has been detected, or that there is no longer a hover input, or it is determined that the hover input has moved to outside of the target area.

An effect of increasing the target area size in step S17 is different behaviour of the terminal 100 in the event of a touch input being detected at a location that is outside the target area of the original size but within the enlarged target area. Following the increase of the size of the target area at step S17, the detection of a touch input in this zone causes selection of the enlarged icon at step S19. Without the increase in the target area at step S17, the provision of a touch input outside of the original target area of the icon would have resulted in no response or a response other than selection of an icon (if the touch input was received at a location between icons) or selection of a different icon (if the touch input was at a location corresponding to one of the other icons).

An advantageous effect of this is to reduce the possibility of a change in location of the user's digit in the x,y plane between the enlarged icon being displayed and the touch input being provided at the touch screen 102 resulting in the icon that is displayed enlarged not being selected. Put another way, once a hover input has resulted in an icon being displayed in an enlarged size, movement of the user's digit towards the touch screen causes the enlarged icon to become partly locked, in the sense that the enlarged icon remains being displayed as long as the location of the hover input does not change too much before the touch input is received. In the event of the enlarged target area being the same size as the enlarged icon, the icon becomes locked to the extent that the enlarged icon is selected as long as the touch input is within the area of the enlarged icon, even if the touch input coincides with a location of another icon or a gap between icons in the originally sized icons.

In order to select an icon, a user may either apply a touch input directly to the icon or may use an intervening hover input. In using a hover input, an icon that is located beneath the user's digit is enlarged, as described above.

Once the user desires to select an icon that is enlarged, they need only move their digit towards the touch screen 102 until it makes contact. As long as contact is made within the area of the enlarged icon, and as long as the movement towards the screen is determined to have been made within any requirements that apply to step S9, the enlarged icon will be selected even if the location of the touch input has moved by significant amount away from the location of the hover input that caused the target area associated with the icon to be enlarged, as long as it has not moved beyond the boundaries of the enlarged icon.

Alternative embodiments within the first group of embodiments will be envisaged to the skilled person.

In embodiments in which an accurate z direction distance can not be determined, or cannot be determined in all circumstances, a movement towards the screen greater than a selection threshold may be determined at step S9 in some other way. For instance, it may be determined by an increase in size or strength of an input exceeding a threshold, which may or may not be required to have been exceeded within a predetermined time period. Alternatively, an input that is determined to have exceeded a certain rate of change for a time period greater than a certain threshold may be determined to be an intentional movement of the user's digit towards the screen.

In hover detection touch screens that are not particularly reliable in providing z direction distances, relative changes in distance may still be reliably detected, and the rate of change in an input may be a reliable way of detecting an intentional movement towards the touch screen.

In embodiments in which a z direction distance can be accurately determined, the selection threshold may be dependent on the distance of the hover input from the touch screen 102. For instance, a hover input at a relatively large distance from the touch screen, for instance a distance of greater than 10 mm, may result in a greater selection threshold than a hover input at a closer distance to the touch screen. For example, a hover input at a distance of between 15 mm and 20 mm from the touch screen 102 may be give rise to a selection distance of 5 mm, falling to 3 mm upon expiry of the dwell timer. A hover input at a distance of between 5 mm and 10 mm may give rise to a selection threshold of 3 mm. Here, the selection threshold may be reduced to a smaller value, for instance 2 mm, upon expiry of a dwell timer. Broadly speaking, the selection threshold may be chosen depending on an initial height of a hover input. The selection threshold may be chosen based on a range in which the initial distance of the hover input falls or may be based on a continuous scale.

The above-described advantages regarding locking of the enlarged icon are experienced without detriment to the user's ability to move between different icons for the reason that the enlarged icon is locked only upon detecting that the users digit has moved towards to the touch screen 102 by an amount exceeding the selection threshold. In the absence of such movement, the user is able to move between different icons, with the icon that is beneath the hover input at the original size being enlarged.

Figure 7:
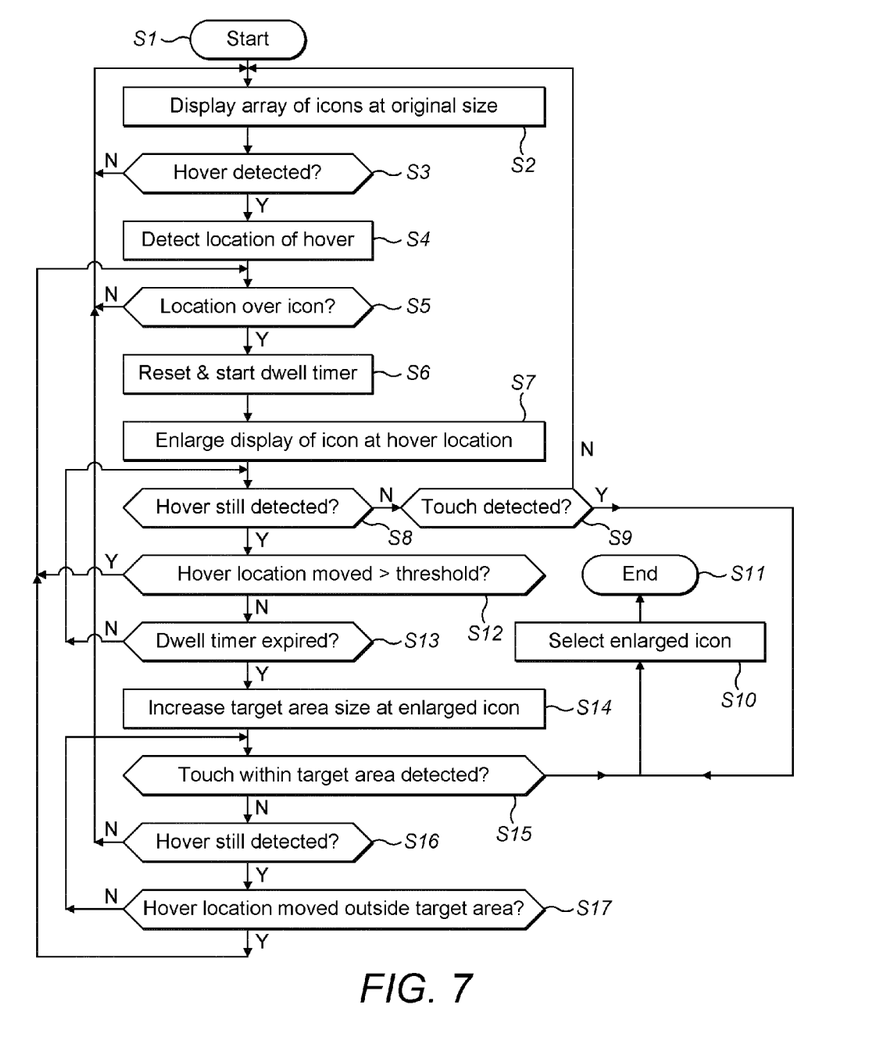
FIG. 7 is a flow chart illustrating operation of the FIGS. 1 and 2 mobile device in a second group of embodiments of the invention.

Operation of the terminal 100 in a second group of embodiments will now be described with reference to the flow chart of FIG. 7. Details of the second group of embodiments are the same as with the first group of embodiments unless otherwise stated or unless there is inconsistency between operation. The response of the terminal 100 to a touch input without a hover being detected beforehand is outside the scope of this specification and is not shown in FIG. 7.

The operation begins at step S1. At step S2, an array of icons is displayed at their original size. This is the same as with step S2 of FIG. 3, and is illustrated in FIG. 4.

At step S3 of FIG. 3, it is determined whether a hover input is detected. If a hover is not detected at step S3, the operation returns to step S2. In this way, the array of icons are displayed at their original size until a hover input is detected at step S3 (or until a touch input is detected, although this is not shown in the Figure). At step S4, the location of the hover is detected. At step S5, it is determined whether the location of the hover is above an icon. In the event of a negative determination, the operation returns to step S2, where the icons in the array are displayed at their original size, as shown in FIG. 4. In this case, steps S3 and S4 are repeated until it is determined that the location of the hover is above an icon.

Following a positive determination at step S5, the terminal 100 enters an icon browse mode. Here, at step S6 a dwell timer is reset and started. Subsequently, at step S7 the display of the icon at the hover location is enlarged. The display resulting at step S7 is shown in FIG. 5. Here it will be seen that most of the display is the same as that shown in FIG. 4. However, one of the icons, labelled A, is shown as enlarged compared to the other icons. The first icon A overlaps some of the other icons, because of its larger size. In this mode, the target area corresponding to the enlarged icon A is unchanged from the original target area size, shown in FIG. 4. As such, the target area corresponding to the first icon A is the same size as the icon prior to enlargement at step S7.

At step S8, it is determined whether a hover is still detected. If it is determined at step S8 that a hover is not still detected, at step S9 it is determined whether a touch input is detected. If a touch input is determined to have been detected at step S9, at step S10 the enlarged icon is selected. After selection of the enlarged icon at step S10, the operation ends at step S11. Here, the terminal 100 exits the icon browse mode.

If at step S9 it is determined that a touch input is not detected, the operation returns to step S2. Here, the terminal 100 exits the icon browse mode.

It will be appreciated that steps S8 to S11 are performed whilst the terminal 100 is in the icon browse mode. As such, step S11 requires the touch to be detected in the target area that has the same size and form as the target area present when the icons were displayed at their original size in step S2. If the touch input is determined to have occurred outside of the target area, then the corresponding icon is not selected at step S10. Although not shown in FIG. 7, if the touch input is detected at a position that does not correspond to any target area, then no action occurs, or alternatively an action other than selection of an icon occurs.

If step S8 shows that a hover is still detected, it is determined at step S12 whether the hover location has moved an amount greater than a threshold. This calculation may be made in the x,y,z space, or it may be made in the x,y plane, or in the x or y direction. The x,y,z or x,y or x or y threshold may take any suitable value. For instance, the value may correspond to 2 mm or a few mm. In the icon browse mode, movement in the x,y plane of a hover input allows the user to enlarge different ones of the icons without selecting any icon.

If at step S12 it is determined that the location has moved by an amount greater than the threshold, the operation returns to step S5. If at step S5 it is determined that the location of the hover input is not over an icon, the operation proceeds to step S2, where the array of icons are displayed at their original size. Once it is determined at step S5 that the location of the hover input is above an icon, whether it is the same icon or a different icon, the dwell timer is reset and started at step S6. Additionally, the icon is displayed at the enlarged size at step S7.

If it is determined at step S12 that the hover location has not moved by an amount greater than the threshold, at step S13 it is determined whether the dwell timer has expired. If it is determined at step S13 that the dwell timer has not expired, the operation returns to step S8. On a positive determination, the terminal 100 exits the icon browse mode and enters an icon lock mode by proceeding to step S14. The entering of the terminal 100 into the icon lock mode may be indicated to the user. This may occur in any suitable way, for instance by displaying a ripple effect on the touch screen 102, in some other visual manner, by providing a haptic feedback, or an audio feedback signal.

The dwell timer may take any suitable value, for instance a few hundred milliseconds. The dwell timer value may for instance be 500 milliseconds. Alternatively, it may take any value in the range of 300 milliseconds to 800 milliseconds, or more specifically in the range of 400 milliseconds to 600 milliseconds.

Operation of the terminal following detection at step S13 that the user's digit has remained at a hover location without moving by more than the threshold distance within the dwell timer period will now be described.

In response to a positive determination at step S13, the operation proceeds to step S14. Here, the size of the target area of the enlarged icon is increased. In particular, the size of the target area is increased from its initial value, which is the same value as that found when the icons are displayed at their original size at step S2, to a value that is greater. The size of the target area after the increase may take any suitable form. In this example, the size of the target area is increased to have the same size as the enlarged icon as displayed following step S7. In this example, the enlarged target area is 20 mm square. Alternatively, the size of the target area may be increased to some other value.

Detection that the user's digit has remained at a hover location without moving by more than the threshold distance within the dwell timer period is a trigger to enlarging the target area associated with the icon.

At step S15, it is determined whether a touch input within the target area is detected. In response to determining at step S15 that a touch input within the target area has been detected, the enlarged icon is selected at step S10. Following step S10, the operation ends at step S11. Here, the terminal 100 exits the icon lock mode.

In response to a determination that a touch input within the target area has not been detected at step S15, the operation proceeds to step S16. Here, it is determined whether a hover input is still detected. Upon determining that a hover input is not still detected, the operation proceeds to return to step S2, where the array of icons is displayed at their original size. Here, the terminal 100 exits the icon lock mode.

Otherwise, it is determined at step S17 whether the location of the hover input has moved to a location outside of the target area. This target area is the enlarged size of target area, following step S14. If it is determined that the hover location has moved to a location outside of the enlarged target area, the operation returns to step S5, from where processing of the location of the hover input and the display of enlarged icons as appropriate is provided. Here, the terminal 100 exits the icon lock mode and enters the icon browse mode. If it is determined at step S17 that the hover location has not moved outside of the enlarged target area, the operation returns to step S15, where it is determined again whether a touch input within the target area has been detected. Steps S15, S16 and s17 are repeated until it is determined that a touch input within the target area has been detected, or that there is no longer a hover input, or it is determined that the hover input has moved to outside of the target area.

As with the embodiments of FIG. 3, an effect of increasing the target area size in step S17 is different behaviour of the terminal 100 in the event of a touch input being detected at a location that is outside the target area of the original size but within the enlarged target area. Following the increase of the size of the target area at step S14, the detection of a touch input in this zone causes selection of the enlarged icon at step S10. Without the increase in the target area at step S14, the provision of a touch input outside of the original target area of the icon would have resulted in no response or a response other than selection of an icon (if the touch input was received at a location between icons) or selection of a different icon (if the touch input was at a location corresponding to one of the other icons).

The embodiments described with reference to FIG. 7 may be particularly advantageous when applied to hover detection touch screens that are not particularly reliable in providing z direction distances, or even are not able to determine a z distance at all, as long as they can detect a hover input and distinguish between a hover input and a touch input.

An advantageous effect of this is to reduce the possibility of a change in location of the user's digit in the x,y plane between the enlarged icon being displayed and the touch input being provided at the touch screen 102 resulting in the icon not being selected. Put another way, once a hover input has resulted in an icon being displayed in an enlarged size, holding the user's digit towards at approximately the same location causes the icon to become partly locked, in the sense that the enlarged icon remains being displayed as long as the location of the hover input does not change too much before the touch input is received. In the event of the enlarged target area being the same size as the enlarged icon, the icon becomes locked to the extent that the enlarged icon is selected as long as the touch input is within the area of the enlarged icon, even if the touch input coincides with a location of another icon or a gap between icons in the originally sized icons.

In order to select an icon, a user may either apply a touch input directly to the icon or may use an intervening hover input. In using a hover input, an icon that is located beneath the user's digit is enlarged, as described above.

Once the user desires to select an icon that is enlarged, they need only move their digit towards the touch screen 102 until it makes contact within the original target area or else wait until the terminal 100 transitions from icon browse mode to icon lock mode and then move their digit towards the touch screen 102 until it makes contact within the enlarged target area. As long as contact is made within the area of the enlarged icon when the terminal 100 is in the icon lock mode, the enlarged icon will be selected even if the location of the touch input has moved by significant amount away from the location of the hover input, as long as it has not moved beyond the boundaries of the enlarged icon.

Locking the icon in any of the ways described above provides an increased likelihood that the user will be able to select the icon that they intended to select, as discussed above. This also helps to mitigate any errors in measurement of location of a hover input in the x,y plane. This advantage is experienced because if the detected location of the hover input in the x,y plane is inaccurate for any reason, this will result in the enlargement of an icon, although this may not be the icon that is immediately below the actual location of the hover input. However, the enlarged icon will be apparent to the user because it is displayed differently to the other icons. If the icon that is enlarged is the icon that the user desires to select, the icon can be selected by the user simply moving their digit from the hover position directly or almost directly to the touch screen 102. Because the enlarged icon is locked once movement greater than the selection threshold is detected, the correct icon will be selected even if the location of the touch input on the touch screen 102 is different to the location of the underlying icon at its original size. Of course, if the icon that is displayed in enlarged view is not the icon that the user desires to select, they may move to another icon by merely changing the position of the hover input. Once the desired icon is enlarged, by virtue of the user's digit being hovered at a different location, the desired icon can be selected by the user moving their finger to contact the touch screen 102, again even if the location of the touch input does not coincide with the icon at the original size that the user desired to select.

In the ones of the embodiments in which a touch user input is detected when the touch input is removed, and the location of the touch input at the time of removal is the location of the touch input, the method described above also provides some immunity due to a change in location than can be caused by a user's digit rolling slightly between contacting a touch screen 102 and being lifted from the touch screen. In conventional user interfaces, rolling of the digit can result in a change in location that is sufficient to allow incorrect icon to be selected. However, locking an enlarged icon as described above can provide a reduced likelihood that an icon that was likely to be selected by the user is not selected by a touch input.

The above-described advantages regarding locking of the enlarged icon are experienced without detriment to the user's ability to move between different icons for the reason that the enlarged icon is locked only upon detecting that the users digit has moved towards to the touch screen 102 by an amount exceeding the selection threshold. In the absence of such movement, the user is able to move between different icons, with the icon that is beneath the hover input at the original size being enlarged.

In some embodiments, the icons are keys of a virtual keyboard. These embodiments are the same as the embodiments described above, although references to keys replace references to icons. The term object may be used as a generic terms to cover both icons and keys of a virtual keyboard. The keys of the virtual keyboard are shown in FIGS. 5 to 9.

It will be appreciated that the above described embodiments are purely illustrative and are not limiting on the scope of the invention. Other variations and modifications will be apparent to persons skilled in the art upon reading the present application.

For instance, although in the above examples the array of icons includes more than one icon in each axis, in other embodiments the array of icons is one-dimensional, i.e. is a list. In handling lists of icons, rather than two-dimensional arrays, operation is the same as described above.

Also, although the icons in the array are shown to be the same size, in other embodiments they may be differently sized. In these embodiments, the icon over which a hover input is detected in enlarged compared to its original size whilst the other icons remain unchanged or remain substantially unchanged. Put another way, the icon over which a hover input is detected is enlarged more than the other icons. The icons may be arranged in a regular array or in an irregular array.

Generally speaking, aside from the icon over which the hover input is detected, the relative sizes of the icons remain unchanged. Modifying slightly the sizes of icons other than the icon over which the hover input is detected is not precluded, as long as the relative size change is greater for the icon over which the hover input is present.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
 causing display of a list or array of objects on a touch screen, wherein a first object of the list or array of objects is selectable in a target area on the touch screen in response to receiving a touch input within the target area, and wherein the target area is of an original target area size;
 in response to detecting a user's digit hovering over the first object but not touching the touch screen, causing display of the first object to be changed from an original size to an enlarged size whilst causing display of other objects to remain substantially or exactly at their original size, wherein when the first object is displayed at the enlarged size, the target area corresponding to the first object is unchanged from the original target area size; and whilst the first object is displayed at the enlarged size, causing, in response to detecting a trigger, the target area for selecting the first object to increase to an enlarged target area size, wherein detecting the trigger comprises at least one of detecting movement of the digit towards the touch screen, or detecting that the digit has been hovering substantially over the first object for a threshold period of time.

2. The method as claimed in claim 1, wherein the enlarged target area size substantially coincides with the enlarged size of the first object.

3. The method as claimed in claim 1, further comprising, whilst the first object is displayed at the enlarged size, responding to detecting the digit no longer hovering over the touch screen by causing display of the first object to be decreased from the enlarged size.

4. The method as claimed in claim 1, further comprising, subsequent to detecting the trigger and increasing the size of the target area to the enlarged target area size, responding to detecting movement of the digit away from the touch screen without the touch screen having been touched by decreasing the target area.

5. The method as claimed in claim 1, further comprising, subsequent to detecting the trigger and increasing the target area, responding to detecting the digit hovering over but not touching the touch screen at a location outside the target area by:

causing display of a second object, at a location corresponding to the location of the digit, to be increased from an original size of the second object to an enlarged size of the second object; and causing display of the first object to be decreased from the enlarged size of the first object whilst causing display of other objects to remain substantially or exactly at their original size.

6. The method as claimed in claim 5, further comprising, whilst the second object is displayed at the enlarged size of the second object, responding to detecting the digit no longer hovering over the touch screen by causing display of the second object to be decreased from the enlarged size of the second object to the original size of the second object.

7. The method as claimed in claim 1, wherein detecting movement of the digit towards the touch screen comprises determining that the digit has moved towards the touch screen by an amount exceeding a selection threshold.

8. The method as claimed in claim 7, further comprising responding to detecting that the digit has been hovering substantially over the first object for a threshold period of time by reducing the selection threshold.

9. The method as claimed in claim 1, wherein the array of objects is a two-dimensional array.

10. An apparatus, the apparatus having at least one processor and at least one memory having computer-readable code stored thereon which, when executed, controls the at least one processor:

to cause display of a list or array of objects on a touch screen, wherein a first object of the list or array of objects is selectable in a target area on the touch screen in response to receiving a touch input within the target area, and wherein the target area is of an original target area size;

to respond to detecting a user's digit hovering over the first object but not touching the touch screen by causing display of the first object to be changed from an original size to an enlarged size whilst causing display of other objects to remain substantially or exactly at their original size, wherein when the first object is displayed at the enlarged size, the target area corresponding to the first object is unchanged form the original target area size; and whilst the first object is displayed at the enlarged size, to, in response to detecting a trigger, increase the target area for selecting the first object to an enlarged target area size, wherein detecting the trigger comprises at least one of detection of movement of the digit towards the touch screen, or detection that the digit has been hovering substantially over the first object for a threshold period of time.

11. The apparatus as claimed in claim 10, wherein the enlarged target area size substantially coincides with the enlarged size of the first object.

12. The apparatus as claimed in claim 10, wherein the code, when executed, controls the processor, whilst the first object is displayed at the enlarged size, to respond to detecting the digit no longer hovering over the touch screen by causing display of the first object to be decreased from the enlarged size.

13. The apparatus as claimed in claim 10, wherein the code, when executed, controls the processor, subsequent to detecting the trigger and increasing the size of the target area to the enlarged target area size, to respond to detecting movement of the digit away from the touch screen without the touch screen having been touched by decreasing the target area.

14. The apparatus as claimed in claim 10, wherein the code, when executed, controls the processor, subsequent to detecting the trigger and increasing the target area, and in response to detecting the digit hovering over but not touching the touch screen at a location outside the target area:

to cause display of a second object, at a location corresponding to the location of the digit, to be increased from an original size of the second object to an enlarged size of the second object; and to cause display of the first object to be decreased from the enlarged size of the first object whilst causing display of other objects to remain substantially or exactly at their original size.

15. The apparatus as claimed in claim 14, wherein the code, when executed, controls the processor, whilst the second object is displayed at the enlarged size of the second object, to respond to detecting the digit no longer hovering over the touch screen by causing display of the second object to be decreased from the enlarged size of the second object to the original size of the second object.

16. The apparatus as claimed in claim 10, wherein the code, when executed, controls the processor to detect movement of the digit towards the touch screen by determining that the digit has moved towards the touch screen by an amount exceeding a selection threshold.

17. The apparatus as claimed in claim 16, wherein the code, when executed, controls the processor to respond to detecting that the digit has been hovering substantially over the first object for a threshold period of time by reducing the selection threshold.

18. A non-transitory computer-readable storage medium having stored thereon computer-readable code, which, when executed by a computing apparatus, causes the computing apparatus to perform a method comprising:

causing display of a list or array of objects on a touch screen, wherein a first object of the list or array of objects is selectable in a target area on the touch screen in response to receiving a touch input within the target area, and wherein the target area is of an original target area size;

in response to detecting a user's digit hovering over the first object but not touching the touch screen, causing display of the first object to be changed from an original size to an enlarged size whilst causing display of other objects to remain substantially or exactly at their original size, wherein when the first object is displayed at the enlarged size, the target area corresponding to the first object is unchanged from the original target area size; and whilst the first object is displayed at the enlarged size, causing, in response to detecting a trigger, the target area for selecting the first object to increase to an enlarged target area size, wherein detecting the trigger comprises at least one of detecting movement of the digit towards the touch screen, or detecting that the digit has been hovering substantially over the first object for a threshold period of time.

* * * * *